(12) United States Patent
Kashiwagi et al.

(10) Patent No.: US 6,179,728 B1
(45) Date of Patent: *Jan. 30, 2001

(54) GOLF BALL

(75) Inventors: Shunichi Kashiwagi; Yasushi Ichikawa; Rinya Takesue, all of Chichibu (JP)

(73) Assignee: Bridgestone Sports Co., Ltd., Tokyo (JP)

(*) Notice: Under 35 U.S.C. 154(b), the term of this patent shall be extended for 0 days.

This patent is subject to a terminal disclaimer.

(21) Appl. No.: 09/413,896

(22) Filed: Oct. 7, 1999

(30) Foreign Application Priority Data

Oct. 7, 1998 (JP) .................................................. 10-284982

(51) Int. Cl.$^7$ .................................................. A63B 37/06
(52) U.S. Cl. .......................................... 473/356; 473/372
(58) Field of Search .................................. 473/372, 373, 473/374, 376, 356; 525/92 A

(56) References Cited

U.S. PATENT DOCUMENTS

| | | | |
|---|---|---|---|
| 5,439,227 | * 8/1995 | Egashira et al. ...................... | 473/373 |
| 5,556,098 | * 9/1996 | Higuchi et al. ...................... | 473/373 |
| 5,596,042 | * 1/1997 | Itoh et al. .......................... | 525/92 A |
| 5,704,854 | * 1/1998 | Higuchi et al. ...................... | 473/373 |

* cited by examiner

Primary Examiner—Jeanette Chapman
Assistant Examiner—Raeann Gorden
(74) Attorney, Agent, or Firm—Sughrue, Mion, Zinn, Macpeak & Seas, PLLC

(57) ABSTRACT

The invention provides a solid golf ball comprising a solid core and a cover, a wound golf ball comprising a solid center, thread rubber and a cover, or a one-piece golf ball. The solid core, the solid center or the one-piece golf ball is formed mainly of a heated mixture of (A) a thermoplastic polyether ester elastomer having a Shore D hardness of 25–60, a tan δ value of 0.01–0.15 in the temperature range of −10° C. to 20° C. as determined by viscoelasticity measurement, and a Tg≦−20° C. and (B) an olefin elastomer, modified olefin elastomer, styrene-conjugated diene block copolymer or hydrogenated or modified styrene-conjugated diene block copolymer having a JIS A hardness of 20–80. The golf ball is unsusceptible to compression set and plastic deformation and has a high resilience, pleasant feel and increased distance.

11 Claims, No Drawings

GOLF BALL

This invention relates to one-piece golf balls, solid golf balls and wound golf balls having a high resilience and improved flight performance, feel and control.

BACKGROUND OF THE INVENTION

Known golf balls include solid golf balls comprising a solid core, an optional intermediate layer and a cover, wound golf balls comprising a wound core (having a solid center and thread rubber) and a cover, and one-piece golf balls formed from a rubber composition into a single piece. Attempts have been made on these golf balls to improve their flight distance and performance by tailoring the materials of their components.

Thermoplastic polyether ester elastomers, because of their flexibility and resilience, are often used in golf balls as the intermediate layer between the core and the cover. These elastomers are also used as various core materials, for example, solid core material, solid center material and one-piece golf ball material.

However, when thermoplastic polyether ester elastomers are used as the core material, their potential compression set raises the problem that the ball undergoes plastic deformation upon hitting.

Partially because the demand on golf balls is diversified in recent years, it is desired to develop a more flexible and resilient material as a multilayer structure material and for the solid core, solid center or one-piece golf ball.

SUMMARY OF THE INVENTION

An object of the invention is to provide solid golf balls, wound golf balls, and one-piece golf balls which are unsusceptible to compression set and have a high resilience, improved flight performance and pleasant feel.

The invention provides a solid golf ball comprising a solid core and a cover, a wound golf ball comprising a solid center, thread rubber and a cover, or a one-piece golf ball. The solid core, the solid center or the one-piece golf ball is formed mainly of a heated mixture of (A) a thermoplastic polyether ester elastomer having a Shore D hardness of 25 to 60, a tan δ value of up to 0.15 in the temperature range of −10° C. to 20° C. as determined by viscoelasticity measurement, and a glass transition temperature of not higher than −20° C. and (B) an olefin elastomer, modified olefin elastomer, styrene-conjugated diene block copolymer or hydrogenated or modified styrene-conjugated diene block copolymer having a JIS A hardness of up to 80. Then the balls leave little compression set, are restrained from plastic deformation upon hitting, and have a high resilience or restitution, improved flight performance and pleasant feel.

DESCRIPTION OF THE PREFERRED EMBODIMENTS

The golf balls contemplated herein include solid golf balls, wound golf balls, and one-piece golf balls. The solid core in the case of a solid golf ball, the solid center in the case of a wound golf ball, or the one-piece golf ball itself, which are comprehensively referred to as a "core sphere" hereinafter, is formed mainly of a heated mixture of components (A) and (B).

Component (A) is a thermoplastic polyether ester elastomer having a Shore D hardness of 25 to 60, preferably 30 to 50, more preferably 30 to 47. A Shore D hardness of higher than 60 leads to an unpleasant feel. A Shore D hardness of less than 25 leads to a lower resilience.

Using a viscoelasticity measurement, the thermoplastic polyether ester elastomer should have a tan δ value of up to 0.15 in the temperature range of −10° C. to 20° C. The tan δ value in the temperature range of −10° C. to 20° C. as determined by viscoelasticity measurement is one index representing viscoelastic properties of a resin. The tan δ value is determined as follows. The elastomer is formed into a specimen having a thickness of 10 mm, a width of 12 mm, and a length of about 35 mm. By means of a viscoelasticity spectrometer Rhios V4.3.2 (Rheometrics Co.), the specimen is measured for loss elastic modulus and storage elastic modulus at a frequency of 62.8 rad/s and a heating rate of 2° C./min in the temperature range of −10° C. to 20° C. The tan δ value is an average determined by dividing the loss elastic modulus by the storage elastic modulus.

The thermoplastic polyether ester elastomer (A) should have a tan δ value of up to 0.15, preferably 0.01 to 0.1, upon viscoelasticity measurement in the temperature range of −10° C. to 20° C. A tan δ value in excess of 0.15 can increase the energy loss of the ball when hit and compromise the resilience of the ball.

Additionally, the thermoplastic polyether ester elastomer should have a glass transition temperature (Tg) of not higher than −20° C.

The thermoplastic polyether ester elastomer (A) is commercially available under the trade name of Hytrel 3078, Hytrel 4047 and Hytrel 4767 from Toray-Dupont K.K.

Component (B) is an olefin elastomer, modified olefin elastomer, styrene-conjugated diene block copolymer or hydrogenated or modified styrene-conjugated diene block copolymer, each having a JIS A hardness of up to 80, especially 20 to 75.

The olefin elastomers include copolymers of ethylene with alkenes of at least 3 carbon atoms, preferably copolymers of ethylene with alkenes of 3 to 10 carbon atoms, and copolymers of α-olefins with unsaturated carboxylic acid esters or carboxyl or carboxylic anhydride group-bearing polymerizable monomers. Exemplary olefin elastomers are ethylene-propylene copolymer rubber, ethylene-butene copolymer rubber, ethylene-hexene copolymers, and ethylene-octene copolymers. Also included are ethylene-propylene-non-conjugated diene copolymers, for example, copolymers using 5-ethylidene norbornene, 5-methylnorbornene, 5-vinylnorbornene, dicyclopentadiene or butene. Illustrative examples are ethylene-propylene-butene copolymers, ethylene-propylene-butene copolymer rubber, and ethylene-ethyl acrylate copolymer resins.

Modified products of the above-mentioned olefin elastomers are also useful. Such modified olefin elastomers include ethylene-ethyl acrylate copolymer resins graft modified with maleic anhydride.

The olefin elastomers are commercially available under the trade name of MITSUI EPT and Toughmer from Mitsui Chemical Industry K.K., ENGAGE from Dow Chemical, and Dynaron from Nippon Synthetic Rubber K.K. A commercial product of the modified olefin elastomer is HPR AR201 from Mitsui-Dupont Polychemical K.K.

Component (B) also includes styrene-conjugated diene block copolymers, preferably those copolymers having conjugated diene blocks composed of butadiene alone, isoprene alone or a mixture of isoprene and butadiene. Also useful are hydrogenated products of these styrene block copolymers, for example, hydrogenated styrene-butadiene-styrene block copolymers and hydrogenated styrene-isoprene-styrene block copolymers.

Such hydrogenated styrene-conjugated diene block copolymers are commercially available under the trade name of Dynaron from Nippon Synthetic Rubber K.K., Septon and Hiblur from Kurare K.K., and Toughtec from Asahi Chemicals Industry K.K. A commercial product of the modified styrene-conjugated diene block copolymer is Epoblend from Dicell Chemical K.K.

One or more of the above-described members in component (A) may be mixed with one or more of the above-described members in component (B) and adjusted as appropriate. As the mixture of (A) and (B), a commercially available product such as Primalloy from Mitsubishi Chemical K.K. may also be used.

In the manufacture of the golf ball, the core sphere is formed mainly from a mixture of components (A) and (B). No particular limit is imposed on the mixing ratio of components (A) and (B). The mixing ratio may be determined as appropriate although it is recommended to mix components (A) and (B) in a weight ratio of from 95/5 to 30/70, more preferably from 90/10 to 40/60. A mixture containing more than 95% by weight of the thermoplastic polyether ester elastomer would be less flexible or soft, fail to improve the controllability and feel of the golf ball, and allow a compression set to be left after hitting, which tends to invite plastic deformation. On the other hand, if the content of the thermoplastic polyether ester elastomer is less than 30% by weight, the mixture would not retain the excellent resilience inherent to this elastomer, resulting in a golf ball having poor flight performance.

While the golf ball of the invention has the core sphere formed mainly of the heated mixture of components (A) and (B), other additives may be blended into the mixture. For examples, fillers such as titanium white, barium sulfate and zinc white and dispersants such as metal soaps may be blended in the mixture when it is used as the solid core material of the solid golf ball or the solid center material of the wound golf ball. In addition to these fillers and dispersants, pigments, antioxidants, UV absorbers and parting agents may also be blended in the mixture when it is used as the one-piece golf ball material.

Preferably, the heated mixture of components (A) and (B) has a Shore D hardness of 20 to 50 as measured according to JIS K7215.

When the core sphere is formed mainly of the mixture of components (A) and (B), any well-known method may be used. For example, a conventional injection molding process is preferably employed. Using a mold having a cavity in conformity with the shape of the desired core sphere, the mixture may be injection molded at a temperature of about 170 to 270° C.

More particularly, the one-piece golf ball is preferably manufactured by injection molding the mixture in a mold having a cavity wall provided with a negative dimple pattern.

Similarly, the solid core of the solid golf ball or the solid center of the wound golf ball can be manufactured by injection molding in a mold. It is recommended that the solid core of the solid golf ball thus molded have an outer diameter of 25 to 40 mm, and especially 27 to 39 mm and that the solid center of the wound golf ball thus molded have an outer diameter of 24 to 38 mm, and especially 25 to 37 mm. If the outer diameter of the solid core or solid center is below the range, the ball as a whole would not be fully resilient. If the outer diameter is above the range, the ball would become less durable against strikes.

The wound golf ball has a wound core consisting of the above-described solid center and thread rubber. The manufacture of the wound core is by winding thread rubber around the solid center in any well-known fashion. The thread rubber layer thus formed should preferably have a (radial) thickness of about 1 to 4.4 mm, and especially about 1.5 to 4.0 mm.

If desired, an intermediate layer may be formed around the solid core of the solid golf ball or the solid center or wound core of the wound golf ball, using any well-known material and method. Exemplary materials for the intermediate layer are thermoplastic polyurethane elastomers, polyether polyester elastomers, and thermoplastic polyamide elastomers. The intermediate layer can be formed by any well-known method such as injection molding. In any ball type, the intermediate layer, if any, preferably has a thickness of 0.5 to 3 mm, and especially 1 to 2.5 mm.

The solid golf ball and wound golf ball of the invention have a cover on the surface of the solid core and wound core, respectively.

The cover stock used herein is not critical. Cover stocks based on balata, ionomer resins or thermoplastic polyurethane elastomers are useful while a proper choice may be made among them.

Preferably the ionomer resin used in the cover has a Shore D hardness of 45 to 70, especially 50 to 65. An ionomer resin with a Shore D hardness of more than 70 would exacerbate the feel and durability against consecutive strikes. An ionomer resin with a Shore D hardness of less than 45 would exacerbate the resilience and lead to a shorter flight distance. Use may be made of commercially available ionomer resins such as "Surlyn" from Dupont, "Himilan" from Mitsui-Dupont Polychemical K.K. and "Iotec" from Exxon.

If desired, various additives such as pigments, dispersants, antioxidants, UV absorbers, and parting agents are added to the ionomer resin in conventional amounts. Additionally, metal oxides such as zinc oxide and barium sulfate, and metal powder such as titanium, lead and tungsten may be blended to increase the specific gravity.

Preferably, the cover is formed mainly of the ionomer resin by injection molding. The cover has an appropriate thickness of 1 to 3 mm, and especially 1.5 to 2.5 mm. If the cover is of multilayer structure, the total thickness preferably falls within this range.

Since the core sphere is formed mainly of a heated mixture of components (A) and (B), that is, a thermoplastic polyether ester elastomer having a high resilience and an olefin elastomer, modified olefin elastomer, styrene-conjugated diene block copolymer or hydrogenated or modified styrene-conjugated diene block copolymer having a high flexibility or a low Shore D hardness, the golf ball becomes unsusceptible to compression set and plastic deformation upon hitting, and has high resilience and is improved in feel and controllability as well as flight performance by virtue of the cooperative action of components (A) and (B).

The golf ball of the invention is provided on its (cover) surface with a multiplicity of dimples. The geometrical arrangement of dimples may be octahedral or icosahedral, and the dimple pattern may be any of square, hexagon, pentagon, and triangle patterns.

The golf ball must have a diameter of not less than 42.67 mm and a weight of not greater than 45.93 grams in accordance with the Rules of Golf.

EXAMPLE

Examples of the invention are given below by way of illustration and not by way of limitation.

Example I

Solid golf balls

Solid cores of the same shape were prepared by injection molding the solid core compositions shown in Table 1 in a core mold.

Around the solid core, the cover compositions shown in Table 1 were injection molded, yielding solid golf balls as shown in Table 2.

The golf balls were examined for various properties by the following tests. The results are shown in Table 2.

The solid core material was formed into a sheet of 1 mm thick by means of an electric heater press (160° C.). The resin sheet was allowed to stand in a thermostat chamber at 23° C. for about 2 weeks before the hardness and tan δ of the sheet were measured by the following methods.

Resin hardness

The 1-mm thick resin sheet was cut into seven strips which were stacked into a laminate, which was measured according to JIS K7215.

Tan δ

Using a viscoelasticity spectrometer Rhios V4.3.2 (Rheometrics Co.), measurement was made on a specimen of about 10 mm wide and about 35 mm long at a frequency of 62.8 rad/s and a heating rate of 2° C./min.

Hitting performance

The ball was hit with a driver (W#1) at a head speed of 45 m/s or a putter (PT). The carry, total distance and spin rate were measured. The feel of the ball when hit was rated "OK" when good and "NO" when objectionable.

Plastic deformation after consecutive strikes

Using a swing robot (True Temper Co.), the ball was hit ten times with a driver at a head speed of 45 m/s and a temperature of 23° C. The roundness of the ball before and after the hitting test was evaluated as follows.

OK: little plastic deformation (or compression set) after consecutive strikes as demonstrated by a difference in roundness before and after the test of less than 0.3 mm NO: noticeable plastic deformation (or compression set) after consecutive strikes as demonstrated by a difference in roundness before and after the test of more than 0.3 mm

TABLE 1

|  | Specific gravity | Hardness | Example | | | | | | | | Comparative Example | | |
|---|---|---|---|---|---|---|---|---|---|---|---|---|---|
|  |  |  | 1 | 2 | 3 | 4 | 5 | 6 | 7 | 8 | 1 | 2 | 3 |
| Core |  |  |  |  |  |  |  |  |  |  |  |  |  |
| Primalloy A1500 | 0.98 | Shore D 17 | — | — | — | — | — | — | 50 | 30 | — | — | — |
| Hytrel 3078 | 1.08 | Shore D 30 | — | — | — | — | — | — | — | — | 100 | — | — |
| Hytrel 4047 | 1.12 | Shore D 40 | 70 | — | — | — | — | — | — | — | — | 100 | — |
| Hytrel 4767 | 1.18 | Shore D 47 | — | 70 | 80 | 80 | 80 | 80 | 50 | 70 | — | — | 100 |
| EG8200 | 0.9 | JIS-A 75 | 30 | 30 | 20 | — | — | — | — | — | — | — | — |
| AR201 | 0.9 | JIS-A 51 | — | — | — | 20 | — | — | — | — | — | — | — |
| A703 | 0.9 | JIS-A 77 | — | — | — | — | 20 | — | — | — | — | — | — |
| Toughtec M1943 | 0.9 | JIS-A 67 | — | — | — | — | — | 20 | — | — | — | — | — |
| Cover |  |  |  |  |  |  |  |  |  |  |  |  |  |
| Himilan 1605 | 0.95 | Shore D 63 | 50 | 50 | 50 | 50 | 50 | 50 | 50 | 50 | 50 | 50 | 50 |
| Himilan 1706 | 0.95 | Shore D 63 | 50 | 50 | 50 | 50 | 50 | 50 | 50 | 50 | 50 | 50 | 50 |

TABLE 2

|  | Example | | | | | | | | Comparative Example | | |
|---|---|---|---|---|---|---|---|---|---|---|---|
|  | 1 | 2 | 3 | 4 | 5 | 6 | 7 | 8 | 1 | 2 | 3 |
| Core |  |  |  |  |  |  |  |  |  |  |  |
| Shore D hardness | 35 | 40 | 45 | 45 | 45 | 45 | 30 | 35 | 30 | 40 | 47 |
| Specific gravity | 1.17 | 1.17 | 1.17 | 1.17 | 1.17 | 1.17 | 1.17 | 1.17 | 1.17 | 1.17 | 1.17 |
| Weight (g) | 35.20 | 35.20 | 35.20 | 35.20 | 35.20 | 35.20 | 35.20 | 35.20 | 35.20 | 35.20 | 35.20 |
| Diameter (mm) | 38.60 | 38.60 | 38.60 | 38.60 | 38.60 | 38.60 | 38.60 | 38.60 | 38.60 | 38.60 | 38.60 |
| Cover |  |  |  |  |  |  |  |  |  |  |  |
| Shore D hardness | 63 | 63 | 63 | 63 | 63 | 63 | 63 | 63 | 63 | 63 | 63 |
| Gage (mm) | 2.05 | 2.05 | 2.05 | 2.05 | 2.05 | 2.05 | 2.05 | 2.05 | 2.05 | 2.05 | 2.05 |
| Ball |  |  |  |  |  |  |  |  |  |  |  |
| Weight (g) | 45.3 | 45.3 | 45.3 | 45.3 | 45.3 | 45.3 | 45.3 | 45.3 | 45.3 | 45.3 | 45.3 |
| Diameter (mm) | 42.7 | 42.7 | 42.7 | 42.7 | 42.7 | 42.7 | 42.7 | 42.7 | 42.7 | 42.7 | 42.7 |
| W #1/HS45 |  |  |  |  |  |  |  |  |  |  |  |
| Carry (m) | 203.5 | 204.3 | 204.9 | 205.1 | 204.5 | 204.5 | 203.0 | 203.8 | 203.0 | 204.5 | 205.3 |
| Total (m) | 216.5 | 217.2 | 219.5 | 219.5 | 218.0 | 218.5 | 216.2 | 216.8 | 216.5 | 217.3 | 219.0 |
| Spin (rpm) | 2555 | 2413 | 2420 | 2415 | 2406 | 2430 | 2660 | 2530 | 2682 | 2420 | 2010 |
| Feel | OK | OK | OK | OK | OK | OK | OK | OK | OK | OK | OK |

TABLE 2-continued

|  | Example | | | | | | | | Comparative Example | | |
| --- | --- | --- | --- | --- | --- | --- | --- | --- | --- | --- | --- |
|  | 1 | 2 | 3 | 4 | 5 | 6 | 7 | 8 | 1 | 2 | 3 |
| PT |  |  |  |  |  |  |  |  |  |  |  |
| Feel | OK | OK | OK | OK | OK | OK | OK | OK | OK | OK | OK |
| Plastic deformation | OK | OK | OK | OK | OK | OK | OK | OK | NO | NO | NO |

Himilan 1605 and 1706 are ionomer resins having a Shore D hardness of 63 by Mitsui-Dupont Polychemical K.K. Hytrel 3078, 4047 and 4767 are thermoplastic polyether ester elastomers by Toray-Dupont K.K.

|  | Shore D hardness | Tg | tan δ (−10 to 20° C.) |
| --- | --- | --- | --- |
| Hytrel 3078 | 30 | −48° C. | 0.07 |
| Hytrel 4047 | 40 | −40° C. | 0.06 |
| Hytrel 4767 | 47 | −35° C. | 0.07 |

EG8200 is an ethylene-octene copolymer with JIS A hardness 75, by Dow Chemical.

Primalloy A1500 is a polymer alloy based on a thermoplastic polyether ester elastomer and a styrene block copolymer, with JIS A hardness 55, by Mitsubishi Chemical K.K. AR201 is a maleic anhydride-graft-modified ethylene-ethyl acrylate copolymer resin with JIS A hardness 51, by Mitsui-Dupont Polychemical K.K.

A703 is an ethylene-ethyl acrylate copolymer resin with JIS A hardness 77, by Mitsui-Dupont Polychemical K.K. Toughtec M1943 is a styrene block copolymer resin with JIS A hardness 67, by Asahi Chemicals Industry K.K.

Example II

One-piece golf balls

One-piece solid golf balls were prepared by injecting molding the materials shown in Table 3 in a mold having a cavity wall with dimple-forming projections. The balls were tested as in Example I. The results are shown in Table 3.

TABLE 3

|  | Specific gravity | Hardness | Example 9 | Comparative Example 4 |
| --- | --- | --- | --- | --- |
| Hytrel 4767 | 1.18 | Shore D 47 | 80 | 100 |
| Toughtec M1943 | 0.9 | JIS-A 67 | 20 | — |
| W#1/HS45 |  | Carry (m) | 199.5 | 199 |
|  |  | Total (m) | 208.5 | 207.5 |
|  |  | Spin (rpm) | 2850 | 2710 |
|  |  | Feel | OK | OK |
| PT |  | Feel | OK | OK |
| Plastic deformation |  |  | OK | NO |

Example III

Wound golf balls

Solid centers of 32 mm in diameter were prepared by injecting molding the solid center materials shown in Table 4 in a mold. It is noted that TiO₂ was added to the center material for specific gravity adjustment.

By winding a rubber thread of a 30/70 rubber blend of natural rubber and low cis-isoprene around the solid centers at a crossing angle of 20 to 40°, wound cores having a diameter of about 39.3 mm were prepared. A pair of hemispherical half cups were formed from a 50/50 ionomer resin blend of Himilan 1601 and Himilan 1557 loaded with titanium white for coloring. Specifically, 4 parts by weight of $TiO_2$ was added to 100 parts by weight of the ionomer blend. Each wound core was encased in the half cups and compression molding was done at 145° C. for 5 minutes. There were obtained wound golf balls.

The balls were tested as in Example I. The results are shown in Table 4.

TABLE 4

|  | Specific gravity | Hardness | Example 10 | Comparative Example 5 |
| --- | --- | --- | --- | --- |
| Center |  |  |  |  |
| Hytrel 4767 | 1.18 | Shore D 47 | 80 | 100 |
| Toughtec M1943 | 0.9 | JIS-A 67 | 20 | — |
| Cover |  |  |  |  |
| Himilan 1601 | — | Shore D 58 | 50 | 50 |
| Himilan 1557 | — | Shore D 57 | 50 | 50 |
| W#1/HS45 |  | Carry (m) | 200.5 | 200 |
|  |  | Total (m) | 210 | 209 |
|  |  | Spin (rpm) | 2862 | 2725 |
|  |  | Feel | OK | OK |
| PT |  | Feel | OK | OK |
| Plastic deformation |  |  | OK | NO |

Himilan 1601 is a Na ionomer resin having a Shore D hardness of 58 by Mitsui-Dupont Polychemical K.K.

Himilan 1557 is a Zn ionomer resin having a Shore D hardness of 57 by Mitsui-Dupont Polychemical K.K.

There have been described solid golf balls, wound golf balls, and one-piece golf balls which are unsusceptible to compression set and plastic deformation, and have a high resilience, improved flight performance and pleasant feel.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A solid golf ball comprising a solid core and a cover enclosing the core, wherein said solid core is formed mainly of a heated mixture of
(A) a thermoplastic polyether ester elastomer having a Shore D hardness of 25 to 60, a tan δ value of up to 0.15 in the temperature range of −10° C. to 20° C. as determined by viscoelasticity measurement, and a glass transition temperature of not higher than −20° C. and
(B) an olefin elastomer, modified olefin elastomer, styrene-conjugated diene block copolymer or hydrogenated or modified styrene-conjugated diene block copolymer having a JIS A hardness of up to 80.

2. The solid golf ball of claim 1 wherein the mixture consists of components (A) and (B) in a weight ratio between 95/5 and 30/70.

3. The solid golf ball of claim 1 wherein the mixture has a Shore D hardness of 20 to 50.

4. The solid golf ball of claim 1 wherein said solid core has an outer diameter of 35 to 40 mm.

5. A wound golf ball comprising a wound core having a solid center and thread rubber wound thereon, and a cover enclosing the wound core, wherein said solid center is formed mainly of a heated mixture of (A) a thermoplastic polyether ester elastomer having a Shore D hardness of 25 to 60, a tan δ value of up to 0.15 in the temperature range of −10° C. to 20° C. as determined by viscoelasticity measurement, and a glass transition temperature of not higher than −20° C. and (B) an olefin elastomer, modified olefin elastomer, styrene-conjugated diene block copolymer or hydrogenated or modified styrene-conjugated diene block copolymer having a JIS A hardness of up to 80.

6. The wound golf ball of claim 5 wherein the mixture consists of components (A) and (B) in a weight ratio between 95/5 and 30/70.

7. The wound golf ball of claim 5 wherein the mixture has a Shore D hardness of 20 to 50.

8. The wound golf ball of claim 5 wherein said solid center has an outer diameter of 24 to 38 mm.

9. A one-piece golf ball formed mainly of a heated mixture of (A) a thermoplastic polyether ester elastomer having a Shore D hardness of 25 to 60, a tan δ value of up to 0.15 in the temperature range of −10° C. to 20° C. as determined by viscoelasticity measurement, and a glass transition temperature of not higher than −20° C. and (B) an olefin elastomer, modified olefin elastomer, styrene-conjugated diene block copolymer or hydrogenated or modified styrene-conjugated diene block copolymer having a JIS A hardness of up to 80.

10. The one-piece golf ball of claim 9 wherein the mixture consists of components (A) and (B) in a weight ratio between 95/5 and 30/70.

11. The one-piece golf ball of claim 9 wherein the mixture has a Shore D hardness of 20 to 50.

* * * * *